United States Patent [19]

Asano

[11] Patent Number: 5,103,308
[45] Date of Patent: Apr. 7, 1992

[54] TELEVISION SIGNAL CONVERTOR

[75] Inventor: Yoshikazu Asano, Kakamigahara, Japan

[73] Assignee: Sanyo Electric Co., Ltd., Osaka, Japan

[21] Appl. No.: 598,318

[22] Filed: Oct. 16, 1990

[30] Foreign Application Priority Data

Oct. 17, 1989 [JP] Japan .................... 1-269298

[51] Int. Cl.[5] .................... H04N 7/01; H04N 11/20
[52] U.S. Cl. ........................ 358/140; 358/11
[58] Field of Search .............. 358/140, 11, 12, 138, 358/133

[56] References Cited

U.S. PATENT DOCUMENTS

| | | | |
|---|---|---|---|
| 4,603,350 | 7/1986 | Arbeiter et al. | 358/140 |
| 4,633,293 | 12/1986 | Powers | 358/11 |
| 4,692,801 | 9/1987 | Ninomiya et al. | |
| 5,001,562 | 3/1991 | Tabata et al. | 358/11 |

FOREIGN PATENT DOCUMENTS

| | | |
|---|---|---|
| 1258581 | 8/1988 | Japan . |
| 1253381 | 9/1989 | Japan . |
| 2-92184 | 3/1990 | Japan . |
| 3-46886 | 2/1991 | Japan . |
| 3-85976 | 4/1991 | Japan . |

OTHER PUBLICATIONS

Development for the MUSE System.
MUSE, A Transmission Method for HDTV Using Satellites.
"Video Signal Processing LSI for MUSE/NTSC Converter", Kimura et al., IEEE 1990 International Conference on Consumer Electronics Digest of Technical Papers, Jun. 6-8, 1990, pp. 200-201.
"MUSE/NTSC Converter", Itoga et al., IEEE Transactions on Consumer Electronics, vol. 35, No. 3, Aug., 1989, pp. 142-150.
"An HDTV Broadcasting System Utilizing a Bandwidth Compression Technique-MUSE", Ninomiya et al., IEEE Transactions on Broadcasting, vol. BC-33, No. 4, Dec., 1987, pp. 130-160.

*Primary Examiner*—James J. Groody
*Assistant Examiner*—Michael M. Lee
*Attorney, Agent, or Firm*—Armstrong, Nikaido, Marmelstein, Kubovcik & Murray

[57] ABSTRACT

A convertor for converting a sub-sample television signal such as MUSE signal, which is obtained from a high density television signal by way of offset sub-sampling the horizontal scan lines of the high density television signal and time compressing the transmission band, to a standard television signal includes odd field and even field vertical filters for filtering odd lines and even lines in the MUSE signal, and time base expanders for selecting predetermined lines from the lines filtered by the odd and even field vertical filters and for expanding on time base the selected predetermined lines. Also, another vertical filter is provided for processing the signal from the time base expanders according to the sub-sampling phase.

2 Claims, 17 Drawing Sheets

Fig. 2
(a) S/H (36a) IN
7.56 MHz RATE
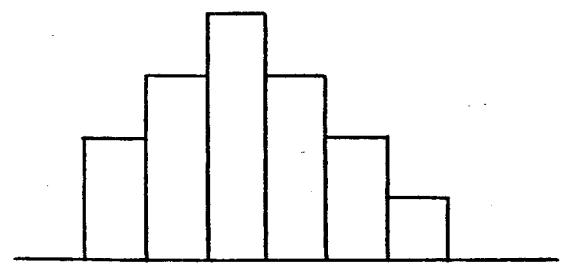
(b) S/H (36a) OUT
7.56 MHz RATE
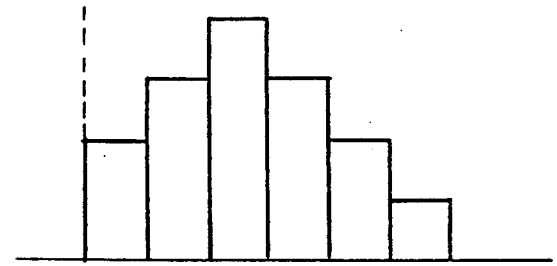
(c) S/H (36b) IN
7.56 MHz RATE
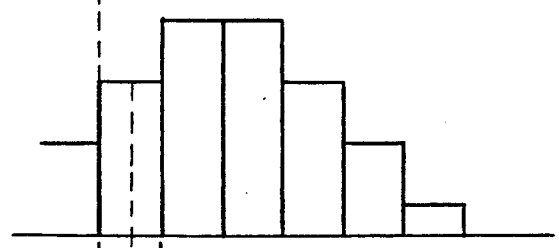
(d) S/H (36b) OUT
7.56 MHz RATE
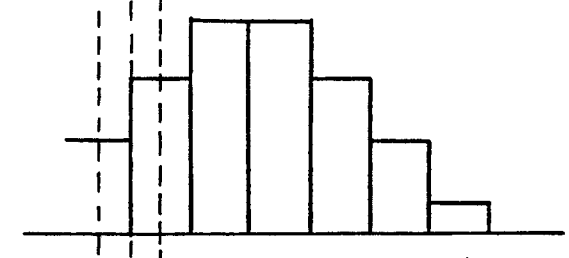
(e) Add (38) OUT
15.12 MHz RATE
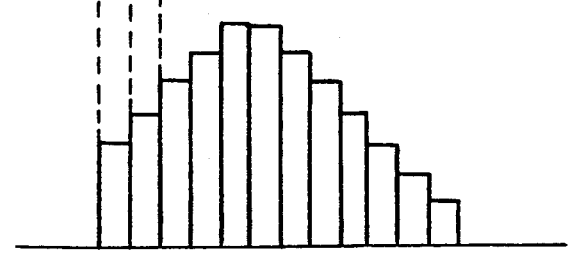

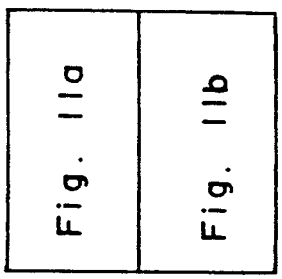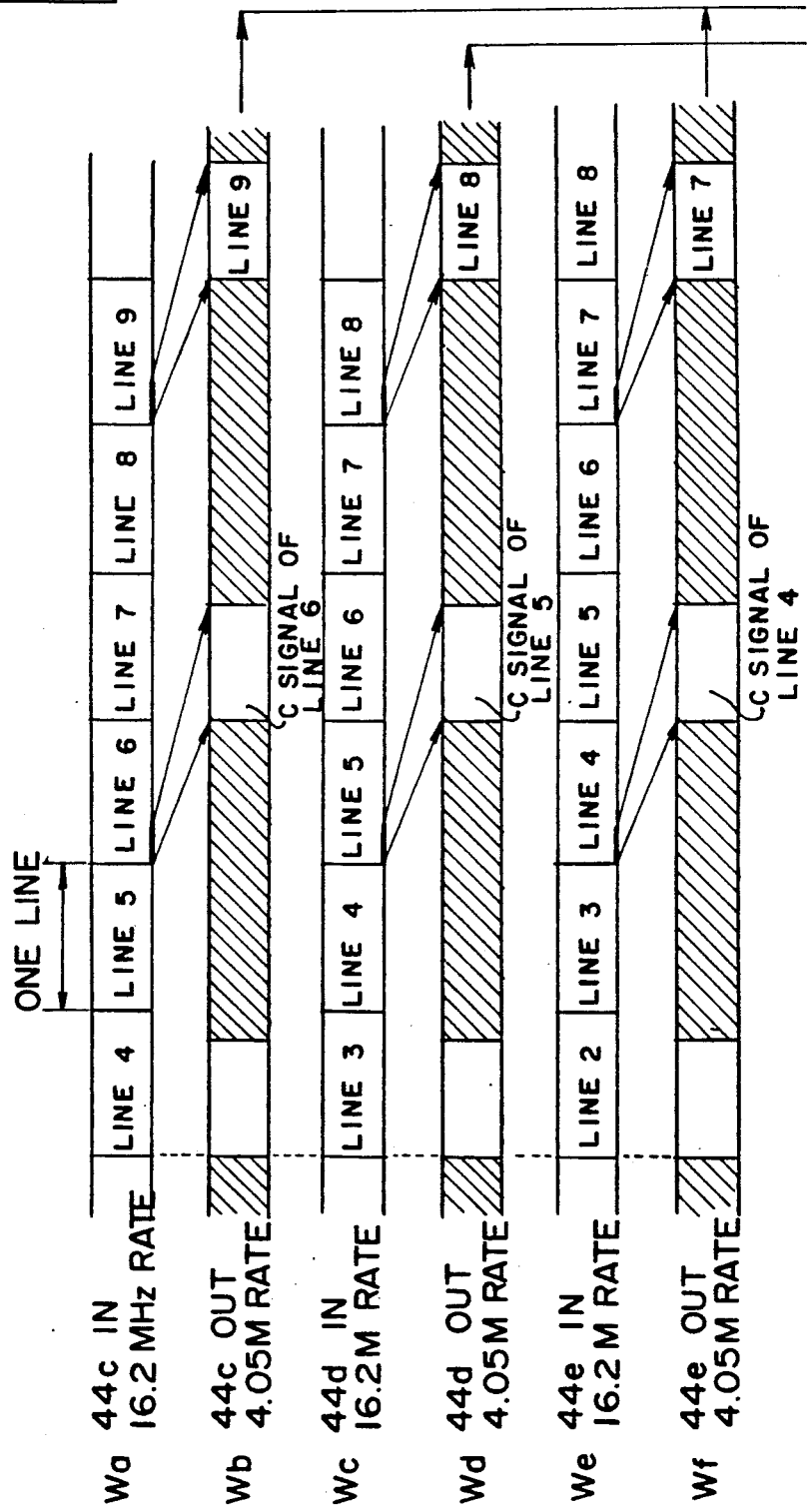

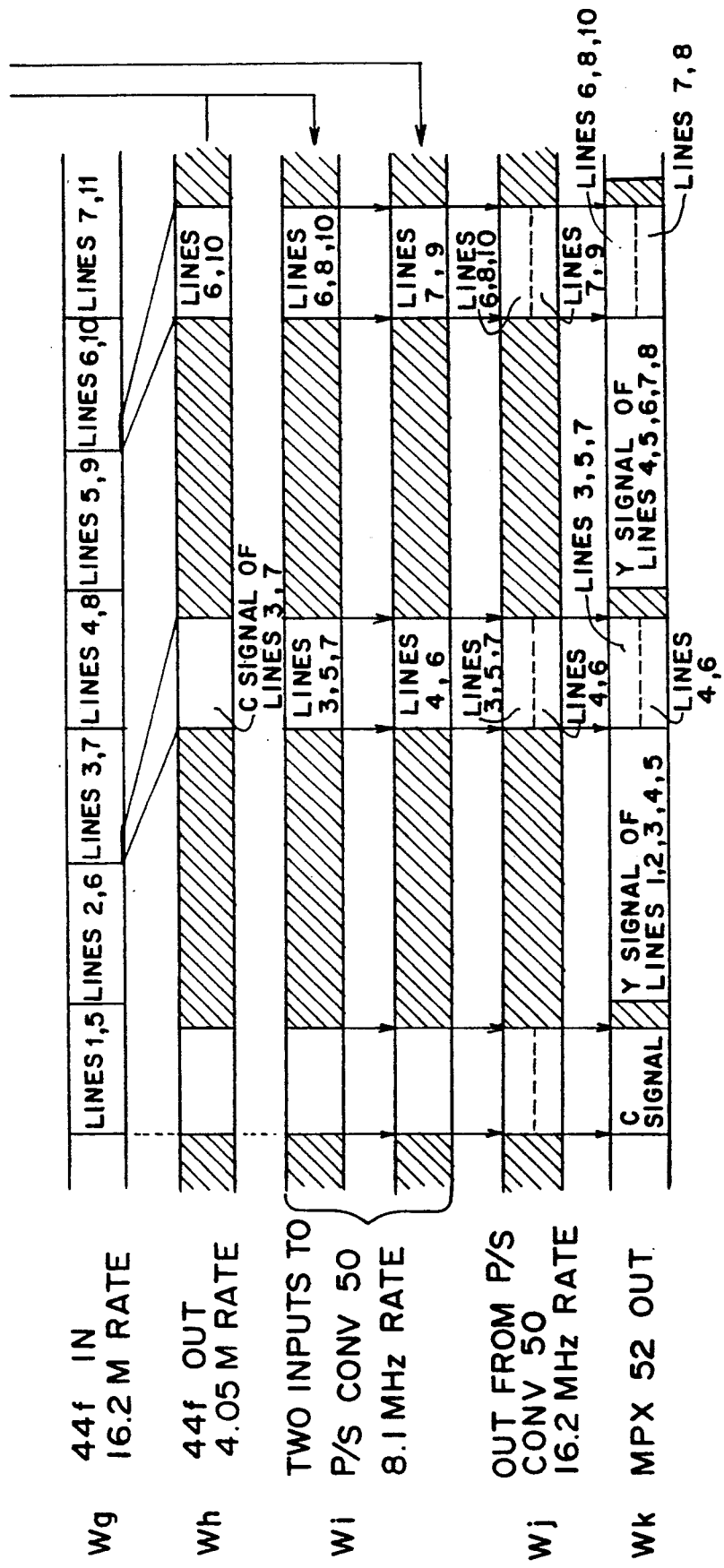

TELEVISION SIGNAL CONVERTOR

BACKGROUND OF THE INVENTION

1. Field of the Invention

The present invention relates to a television convertor, and particularly to an MUSE/NTSC down-convertor.

2. Description of the Prior Art

The Multiple Sub-Nyquist Sampling Encoding (MUSE) method has been proposed by NHK, a Japanese national television broadcasting station, as one means of band width compression of a high definition video signal for transmission by broadcast satellite, and is currently used in regularly scheduled experimental broadcasts on the second channel on NHK Satellite (BS channel 11) broadcasts.

According to the MUSE method, sub-Nyquist sampling is carried out on the high definition video signal, which is being broadcasted as a high definition video signal over a single satellite broadcast channel (28-MHz band width), by means of a band width compression encoder, and converts the 28-MHz band width signal to an 8.1-MHz band width compression video signal (MUSE signal, sub-sample video signal).

It is to be noted that the MUSE method has been introduced in the references as follows.

(a) NHK Research and Development, 1987, vol. 39, issue 2, number 172, pp. 18 (76)–53 (111); Ninomiya, Otsuka, Izumi, Goshi, Iwadate, "Development of the MUSE method."

(b) Nikkei Electronics, pub. Nikkei-McGraw Hill, No. 433, Nov. 2, 1987, pp. 189–212, Ninomiya, "MUSE, a transmission method for HDTV using satellites."

In addition, a summary of the process whereby a base band HDTV signal is sub-sampled to produce a MUSE signal is shown in FIG. 12.

In FIG. 13 is shown the assignment of the MUSE signal in one frame. It is to be noted that the image corresponding to the area of the video period is also shown in FIG. 13.

The MUSE/NTSC down-convertor is discussed next.

As shown in FIG. 14, the playback screen in HDTV during MUSE signal reproduction has an aspect ratio of 16:9. The number of horizontal scan lines in this screen area is approximately 510. Note that the aspect ratio in a conventional television during reproduction of a normal NTSC signal is 4:3 (16:12). Furthermore, the number of horizontal scan lines in this screen area is approximately 240.

To view the image represented by this MUSE signal on a conventional television, a MUSE/NTSC down-convertor which converts the 1125 scan line MUSE signal to a 525 scan line NTSC signal is required. It is to be noted that because this MUSE/NTSC down-convertor does not convert the field frequency, the field frequency of the converted NTSC signal is the same 60 Hz as the MUSE signal, which is different from the standard value (59.94 Hz); while this converted NTSC signal is not strictly an NTSC signal, the converted signal is considered an NTSC signal because it can be viewed on an NTSC format television.

For viewing the 16:9 aspect ratio MUSE playback image as shown in FIG. 15a on a conventional 4:3 aspect ratio television, the MUSE/NTSC down-convertor (hereinafter referred to as a convertor) can have two possible modes, a wide mode as shown in FIG. 15b and a zoom-up mode as shown in FIG. 15c.

These conversion methods are described in detail in Japanese patent applications H1-183397 and H1-223779, and are therefore described briefly hereinbelow.

One approach for the conversion of the video signal in the zoom-up mode is to simply converting the 516-line signal in the Y video period of the MUSE signal to a 240-line signal for NTSC, but this conversion is troublesome. Instead, a 240-line NTSC signal is produced from the 480-line MUSE signal as shown in FIG. 16. In other words, one NTSC signal horizontal scan line is formed by two MUSE signal horizontal scan lines. Synchronization signals can then be simply added to achieve 262.5 scan lines per field so that the 240-line video signal thus produced conforms to NTSC standards.

Furthermore, in wide mode conversion, the 516-line video signal in the MUSE signal can be converted to an approximately 170-line video signal and NTSC standard synchronization lines added thereto. In other words, it is sufficient if the horizontal scan lines are reduced to approximately one-third.

Also, according to the aforementioned Japanese patent application H1-223779, the 170-line video signal for NTSC was obtained by discarding one of the three MUSE signal horizontal scan lines, and mixing the remaining two lines into one. However, because in this construction one of the video signals is discarded, the picture quality of the converted image is lowered.

The down-convertor manufactured by Mitsubishi Electric Co., Ltd. of Japan which has solved this problem processes the video signal of the MUSE signal by mixing and adding two horizontal scan lines into one line in the same manner as the wide mode described hereinabove. Thus, the 516-line MUSE signal is converted to a signal with approximately one-half or 260 scan lines. Then, this primary conversion 260-line video signal is processed to mix three horizontal scan lines into two to produce an approximately 170-line video signal.

However, this down-convertor performs two conversions, and is troublesome.

The present invention relates to a technology for providing a down-convertor wherein horizontal scan line picking (e.g., 3 lines →1 line) in the time base expander circuit can be executed by performing vertical filter (30a, 30b) processing at the stage preceding the time base expanders (32a, 32b) (44a, 44b).

Specifically, the clock frequency of the MUSE signal in the stage preceding the time base expanders (32a, 32b) (44a, 44b) is 16.2 MHz. Then, as also shown in FIG. 12, the MUSE signal sampling point is offset each line. Thus, to execute all vertical filter processing in the stage preceding the time base expanders, the MUSE signal in the vertically adjacent lines must be added. To do this, the timing must be shifted one-half period (this processing is called sub-sampling shift processing), the clock frequency rate is doubled (to 32.4 MHz), and high speed processing is required.

SUMMARY OF THE INVENTION

The present invention has been developed with a view to substantially solving the above described disadvantages and has for its essential object to provide a down-convertor which enables vertical filter processing without high speed processing of the MUSE signal.

In order to achieve the aforementioned object, according to the present invention, video signals in horizontal scan lines having the same sub-sample phase are mixed and added in the vertical filter circuits 30a, 30b. Specifically, two vertical filter circuits 30a and 30b are provided because there are two sub-sample phases in a MUSE signal. Then, after time base expansion (including both simple time base expansion and time base expansion for NTSC signal conversion) of this MUSE signal, the signal is filtered by the vertical filter circuit 34 for sub-sample shifting.

Specifically, the present invention is, within a MUSE signal/standard television signal convertor which converts a MUSE signal to a standard television signal, characterized by a first and second vertical filter circuit (30a, 30b) for the odd lines and even lines in the MUSE signal, first and second time base expanders (32a, 32b) (44a, 44b) which time base expand a signal for a specified line in the signal from the first and second vertical filter circuit (30a, 30b) and pick the lines, and a third vertical filter circuit 34 which processes the signal from the first and second time base expanders (32a, 32b) (44a, 44b) according to the sub-sample phase.

Because the MUSE signals wherein the line sampling phase is the same are processed by first and second vertical filter circuits 30a, 30b, high speed processing is not required in the present invention.

Also, because a signal once slowed by time base expansion is processed by a third vertical filter circuit 34 for sub-sample shift processing, the sampling clock frequency of the output of this third vertical filter circuit 34 is not very high.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 2, 3, 4 and 5 are diagrammatic views of signals processed in the circuit of FIG. 1;

FIGS. 9, 10 and 11 are diagrammatic views of signals processed in the circuit of FIG. 8, in which FIG. 11 is divided to FIGS. 11a and 11b;

FIG. 17b is a diagram showing signal filtering by the circuit of FIG. 17a.

DETAILED DESCRIPTION OF THE PREFERRED EMBODIMENTS

A first embodiment of the present invention is described with reference to FIGS. 1 to 5.

Figure 1:
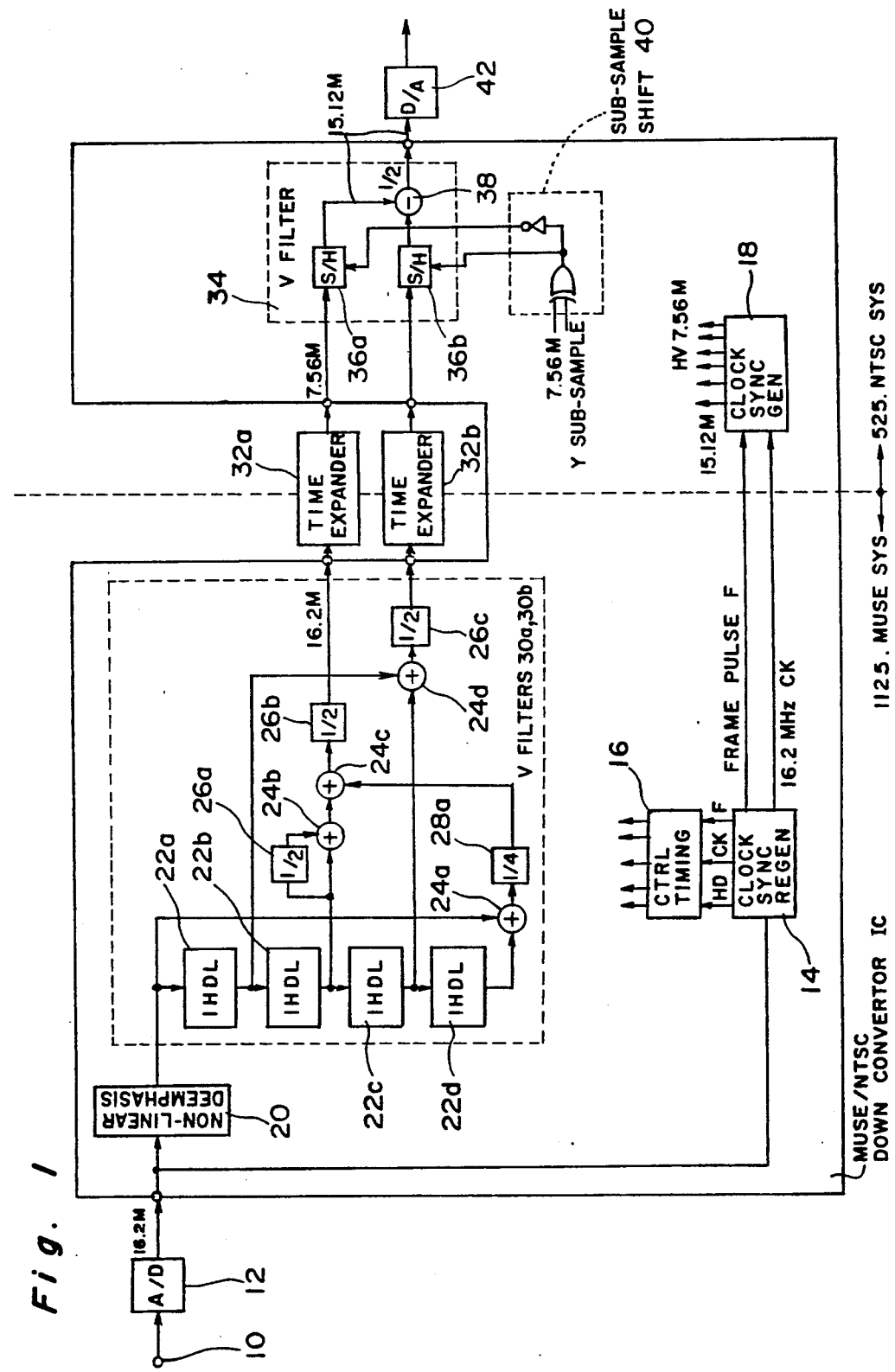
FIG. 1 is a block diagram of a first embodiment of the present invention.

In FIG. 1, reference number 10 is a MUSE signal input terminal, and reference number 12 is an A/D convertor. Reference number 14 is a clock sync regenerator which outputs a clock signal (16.2 MHz) frame pulse and HD pulse synchronized to the input MUSE signal. Reference number 16 is a control timing generator circuit which outputs control signals, including clock signals (16.2 MHz, 8.1 MHz, 4.05 MHz, etc.) and sub-sample phase signals, to control the 1125-line processor circuit.

Reference number 18 is a clock sync generator circuit which outputs control signals for, including, the various NTSC signal clock signals (15.12 MHz, 7.56 MHz, 3.78 MHz), sync signals, and field inversion output. This circuit 18 inputs and synchronizes the frame pulse (F) and clock signal (16.2 MHz) from the clock sync generator 14 for the MUSE signal. In other words, the input MUSE signal and the output NTSC signal have different horizontal scan frequencies, but the frame cycle is the same 30 Hz, thus establishing a specific synchronized relationship.

Reference number 20 is a non-linear deemphasis circuit 20. Reference numbers 22a, 22b, 22c, and 22d are 1H delay circuits comprising memory devices which delay the MUSE signal one horizontal period. Reference numbers 24a, 24b, 24c, 24d are adders, 26a, 26b, and 26c are ½ multipliers, and 28a is a ¼ multiplier.

These are divided into vertical filter circuit 30b, comprising circuits 22a, 22b, 22c, 24d, 26d, and another vertical filter circuit 30a, comprising circuits 22a, 22b, 22c, 22d, 24a, 26a, 24c, and 26b. These two filters are for odd number lines and even number lines, and therefore, their operation naturally changes every other line.

Reference numbers 32a, 32b are time base expanders comprising memory elements. These circuits 32a, 32b time base expand the MUSE signal to correspond to the video for NTSC. Specifically, the 16.2 MHz rate MUSE signal from the vertical filter circuit is written one line in every three lines to the time base expansion circuits 32a, 32b at a 16.2-MHz rate, and is read at a 7.56 MHz rate. Thus, the 373/(16.2 MHz) sec video period in one horizontal scan becomes 373/(16.2 MHz) 16.2 MHz/(7.56 MHz = 49.3 μsec, matching the video period in one horizontal scanning period in an NTSC signal.

Reference number 34 is a vertical filter circuit corresponding to the offset sample. Reference numbers 36a, 36b are sub-sample shift circuits comprising a sample hold circuit. Reference number 38 is an adder circuit which converts and ½ multiplies two inputs, and outputs a 15.12 MHz rate video signal. A sample signal waveform in this vertical filter circuit 34 is shown in FIG. 2.

Reference number 40 is a sub-sample shift control signal generator circuit comprising an EX-OR circuit and a NOT circuit. Reference number 42 is a D/A convertor, and outputs an NTSC video signal.

The operation of this circuit is described below.

Figure 3:
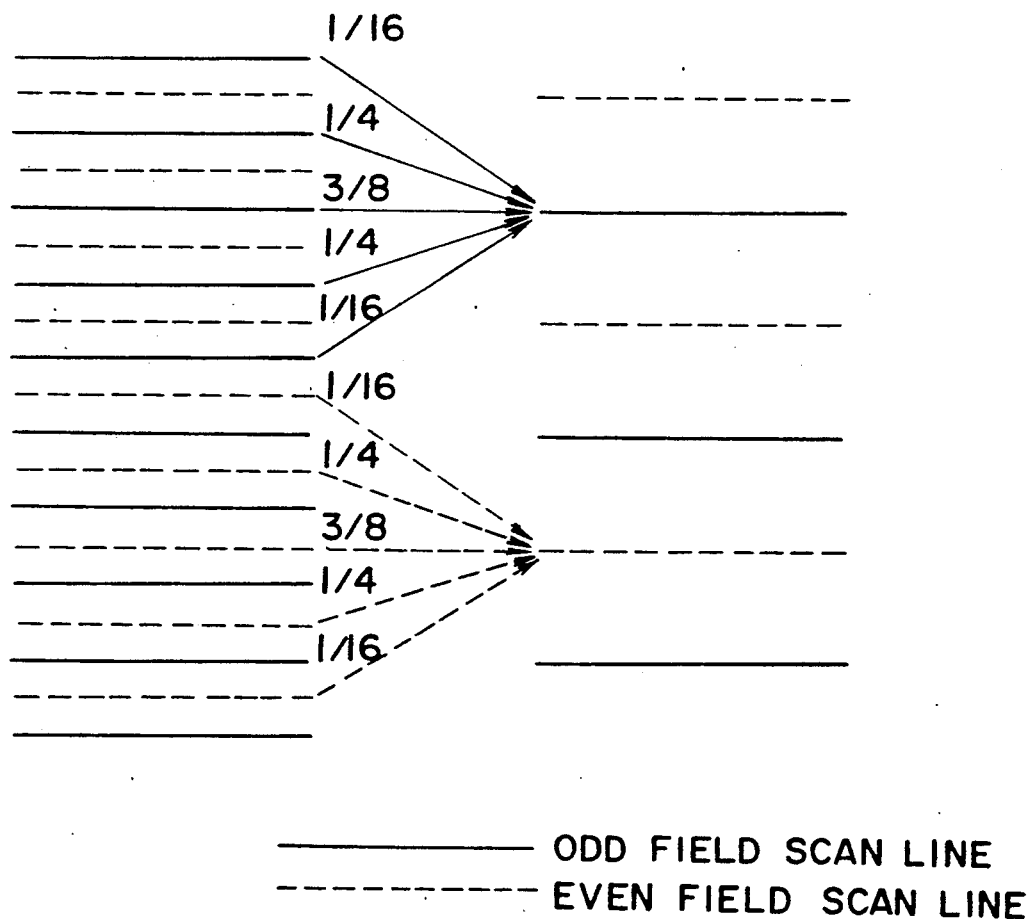

The circuit shown in FIG. 1 is for generating a one-line NTSC signal from the three lines of a MUSE signal, as shown in FIG. 3.

The MUSE signal input from terminal 10 in FIG. 1 is converted to a digital data MUSE signal by the A/D convertor 12. Then the MUSE signal is input to the clock sync generator 14. The clock sync generator 14 outputs various signals (frame pulse, line pulse (HD), 16.2 MHz clock) synchronized to the input MUSE signal. The control timing signal generator circuit 16 controls, using these signals, the A/D convertor 12, the writing of time base expanders 32a, 32b and other circuits in the 1125-line MUSE system. On the other hand, the clock sync generator circuit 18, which generates an NTSC clock signal synchronized (e.g., synchronized as shown in FIG. 4) to this MUSE signal, controls the D/A convertor 42, the time base expanders 32a, 32b and other circuits in the 525-line NTSC system.

The MUSE signal from the A/D convertor 12 is applied to vertical filter circuits 30a, 30b through the deemphasis circuit 20. In the vertical filter circuits 30a, 30b, the MUSE signals separated by two lines are added with a specific coefficient.

Figure 4:
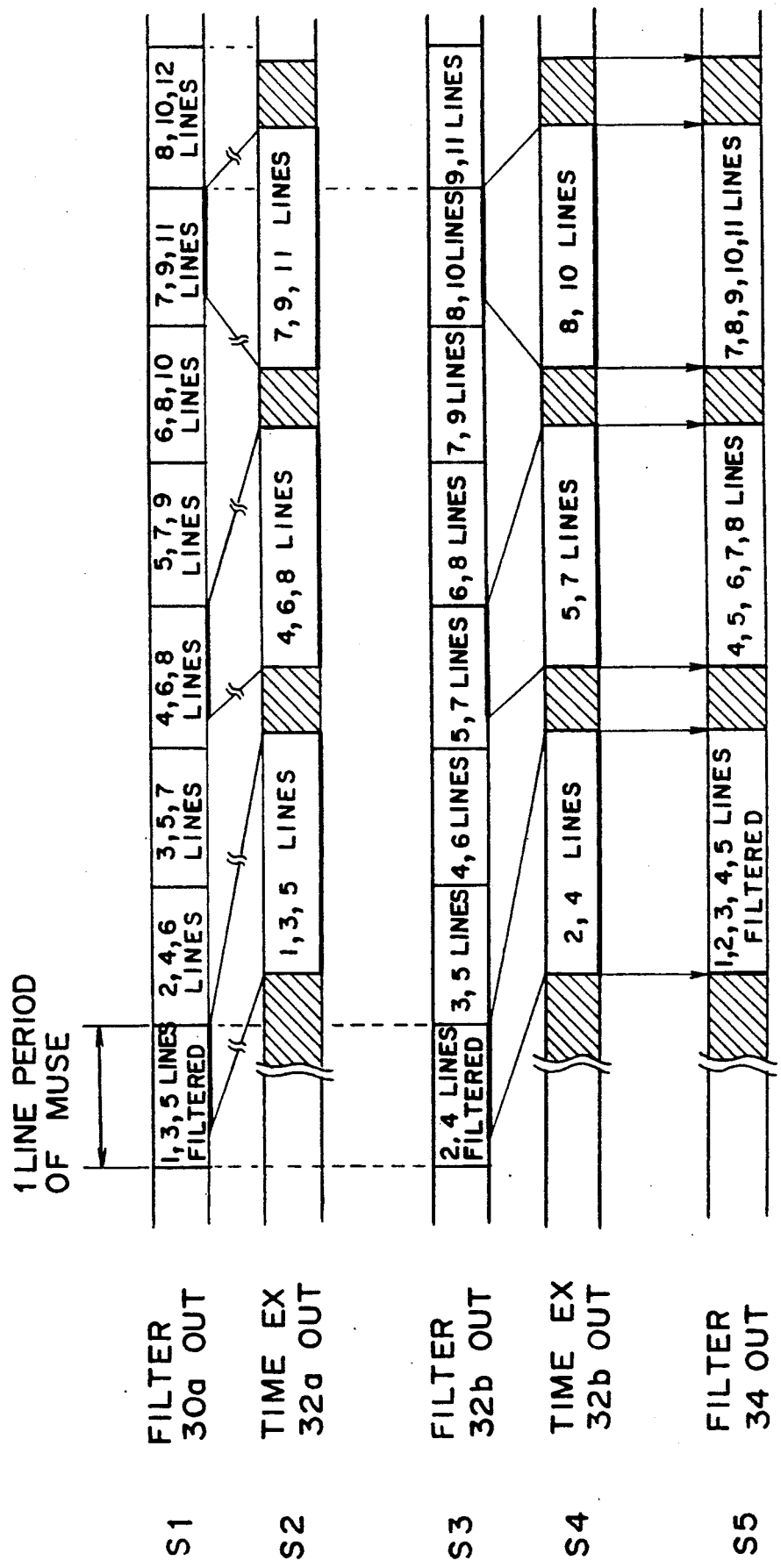

As shown in FIG. 4, particularly signals S1 and S3, each of the vertical filters 30a, 30b outputs alternately an odd lines added signal and an even lines added signal together. Specifically, each vertical filter generates the filtered signals (i.e. filter process output signals in the vertical direction). Then, since the line signals, which are separated by two lines, have the same sub-sample phase, a sampling rate remains the same, i.e., 16.2 MHz.

The time base expanders 32a, 32b each writes the video period only (area marked by a heavy line in signals S1 and S3) at the rate of one line per three lines in the filtered signal based on a signal from the control timing signal generator circuit 16. The signal is then read out from the time base expanders 32a, 32b at the timing of the heavy lines in signals S2 and S4 according to the control signal from the clock sync generator circuit 18. The video period at this time is approximately 49 $\mu$sec because the reading rate at this time is 7.56 MHz.

It is to be noted that the video period 49 $\mu$sec is short compared with the video period of the normal NTSC signal, but this is no particular problem because the horizontal raster is overscanned in normal television.

The output of the time base expanders 32a, 32b is mixed in the vertical filter circuit 34, such as shown in FIG. 2e, by vertical filter processing based on sub-sample shift processing, and a filtered NTSC signal is obtained as shown in FIG. 3. It is to be noted that the sync signal is inserted to the shaded area in signal S5 (FIG. 4) afterwards.

Figure 17A:
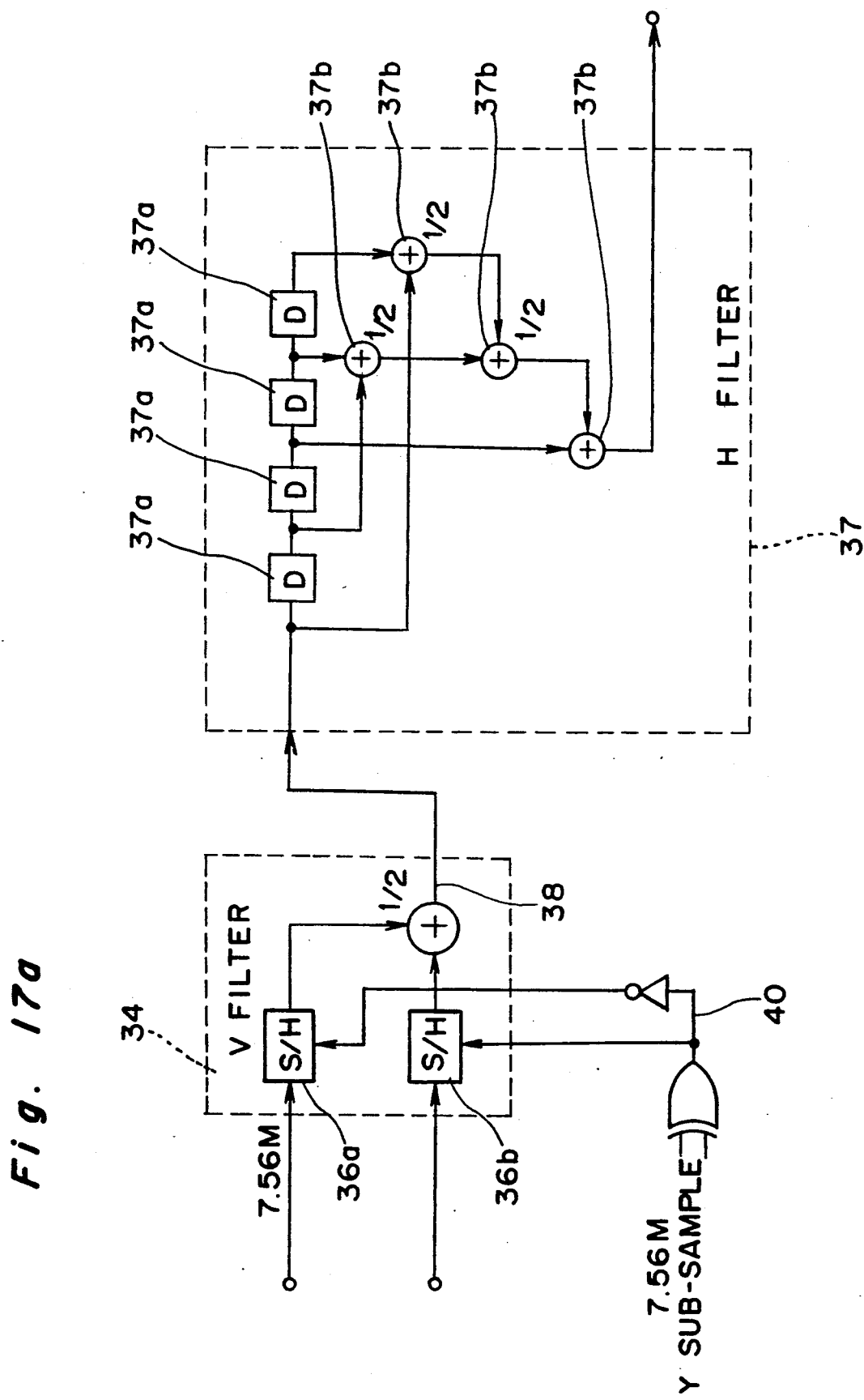
FIG. 17a and is circuit diagram of a horizontal filter added to the circuit of FIG. 1.
Figure 17B:
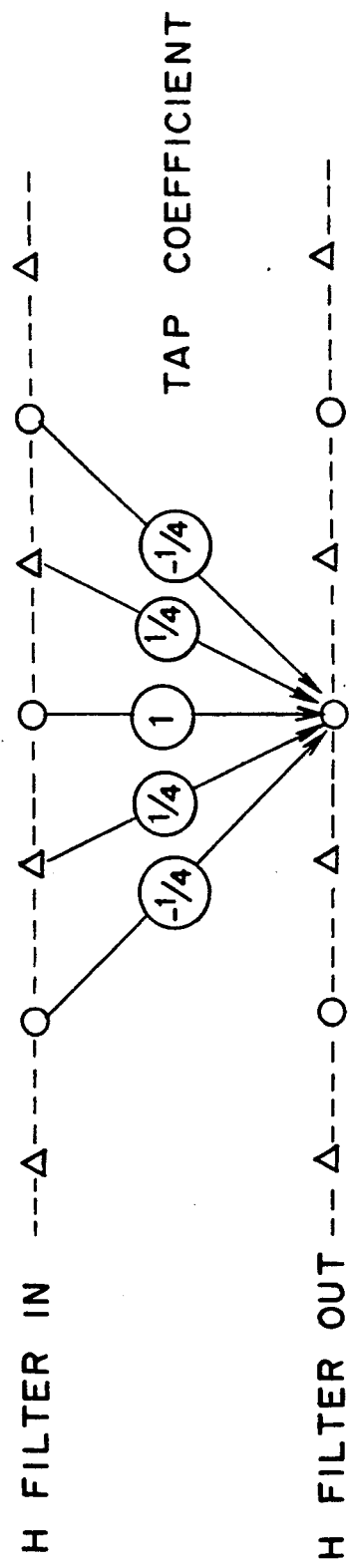

As shown in FIG. 17a, in order to emphasize the 4MHz band video signal in the NTSC signal, a horizontal filter circuit 37 may be provided in a stage after the vertical filter 34. Four one-clock delay circuits 37a, 37a, 37a, 37a and four adders 37b, 37b, 37b, 37b are provided in the horizontal filter 37. The tap coefficients of the adders are shown in FIG. 17b. Therefore, with the use of the horizontal filter circuit 37, the filtering of the horizontal video signal is carried out by multiplying the pixel signals with suitable tap coefficients and adding the multiplied pixel signals.

The deficiencies of this circuit are next described. Developing an integrated circuit version of this circuit is important to the development of the down-convertor as a commercial product. In addition, the number of pins is one indicator of the product value of the IC device. Furthermore, when integrating this circuit, because a large memory area is required, a built-in type memory can not be formed in an IC chip, but instead, a general purpose external memory device is used.

Figure 5:
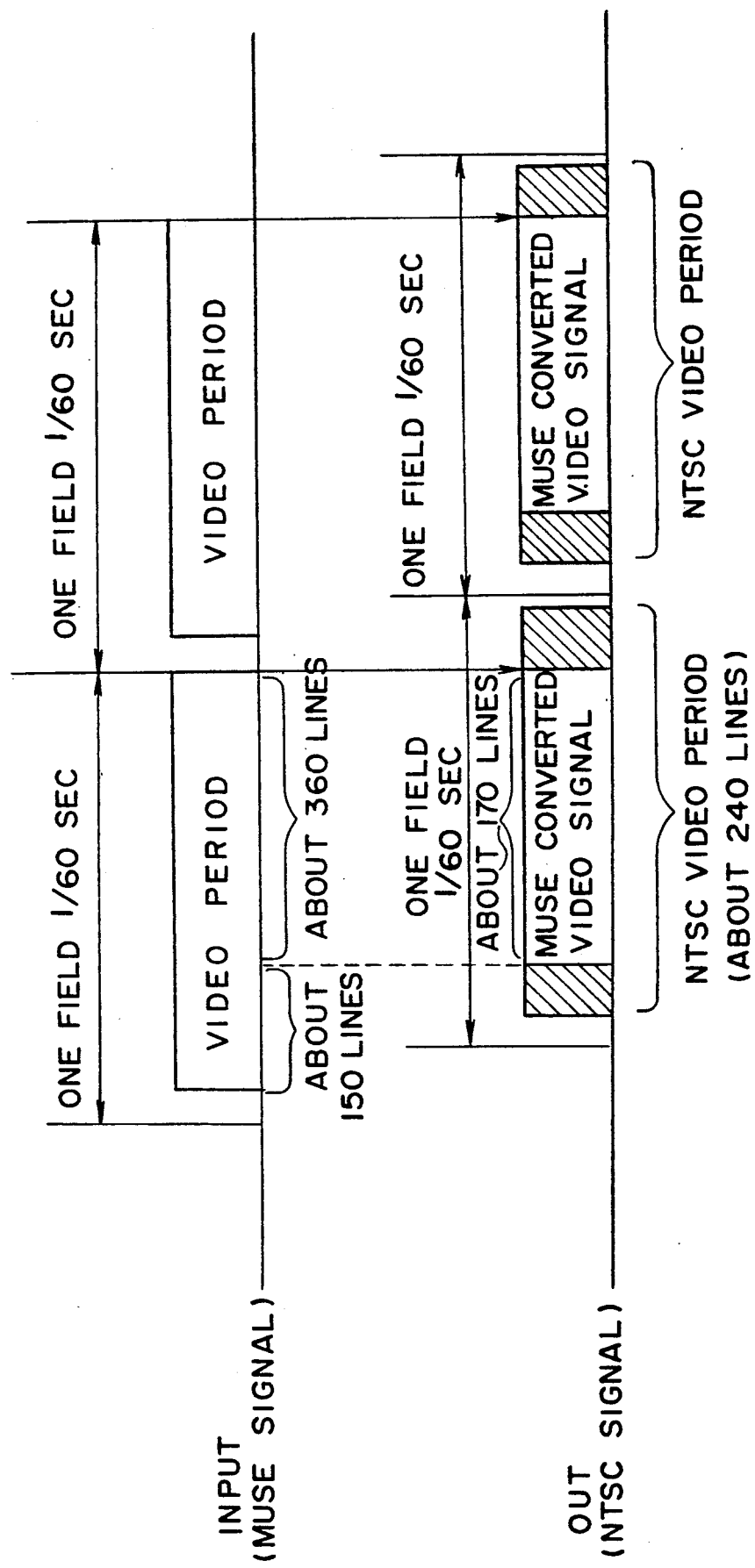

Here the time base expanders 32a, 32b convert the MUSE signal to an NTSC signal, but a time delay of approximately 150 lines in an NTSC signal is generated as shown in FIG. 5 between the input MUSE signal and the output NTSC signal. Therefore, the time base expanders 32a, 32b must absorb a time delay equivalent to 150 lines, and the memory capacity must also be equivalent to 150 lines. Even after the forming of one line from three lines, the memory must have a capacity equivalent to 50 lines. Because it is difficult to form a 150-line capacity memory in the IC device, the time base expanders 32a, 32b are comprised of general purpose external memory as described above. However, as shown in FIG. 1, this requires two inputs and two outputs, a total four inputs and outputs. If the video data is comprised of eight bit data, 32 pins are therefore required to obtain four inputs and outputs. Moreover, the number of output terminals required for control signals from the circuits 16 and 18 used for memory control is the same as the number of memory control signals.

Figure 6:
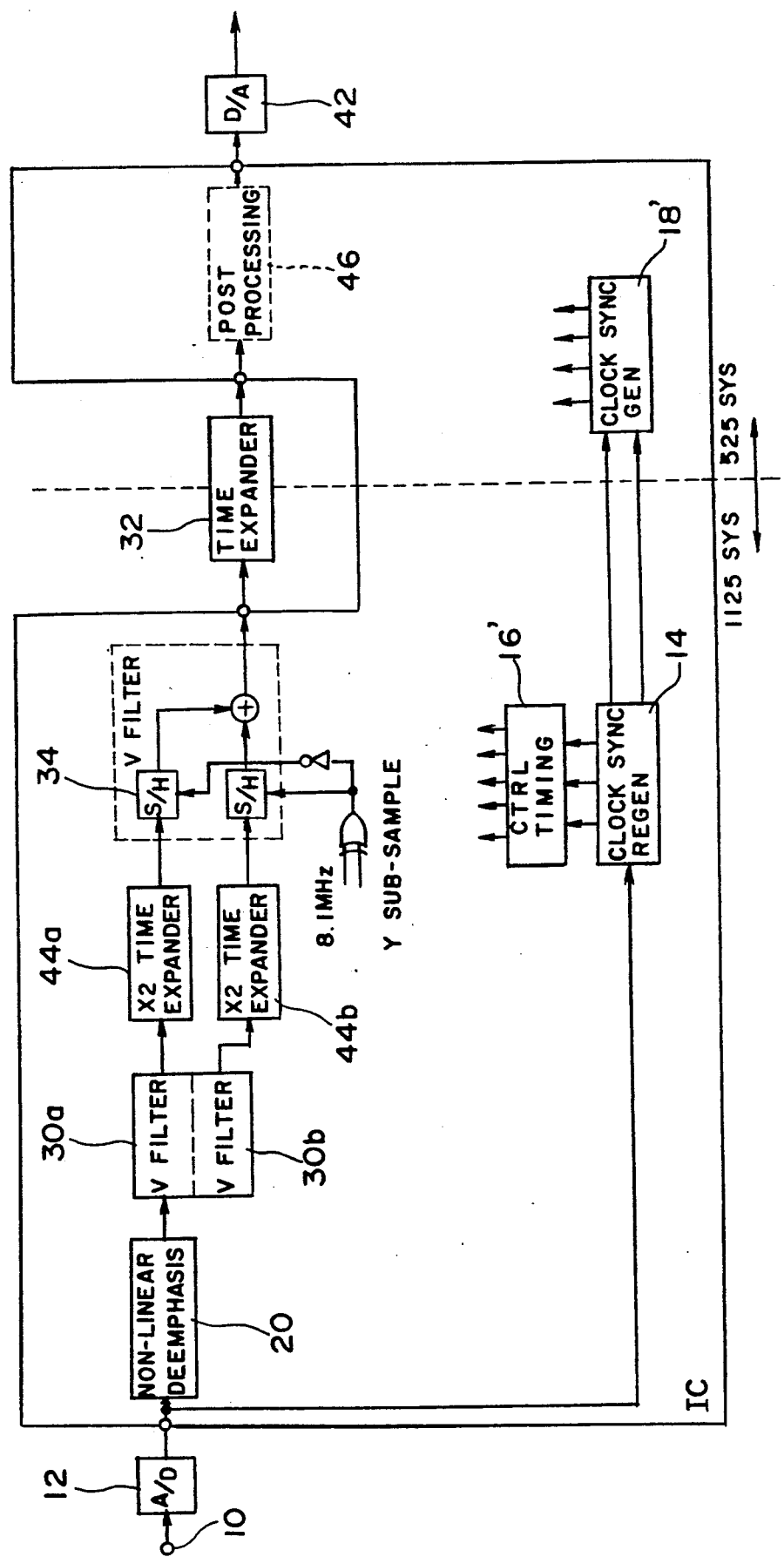
FIG. 6 is a block diagram of a second embodiment of the present invention.

Referring to FIG. 6, a second embodiment of the present invention is shown which resolves these deficiencies.

The second embodiment provides in place of the aforementioned time base expanders, time base 2-times expansion circuits 44a, 44b which slow the MUSE signal (reduce the rate by one-half), and further provides an additional time base conversion circuit 32 after the vertical filter circuit 34 to convert the signal to a video signal of the NTSC standard.

Figure 7:
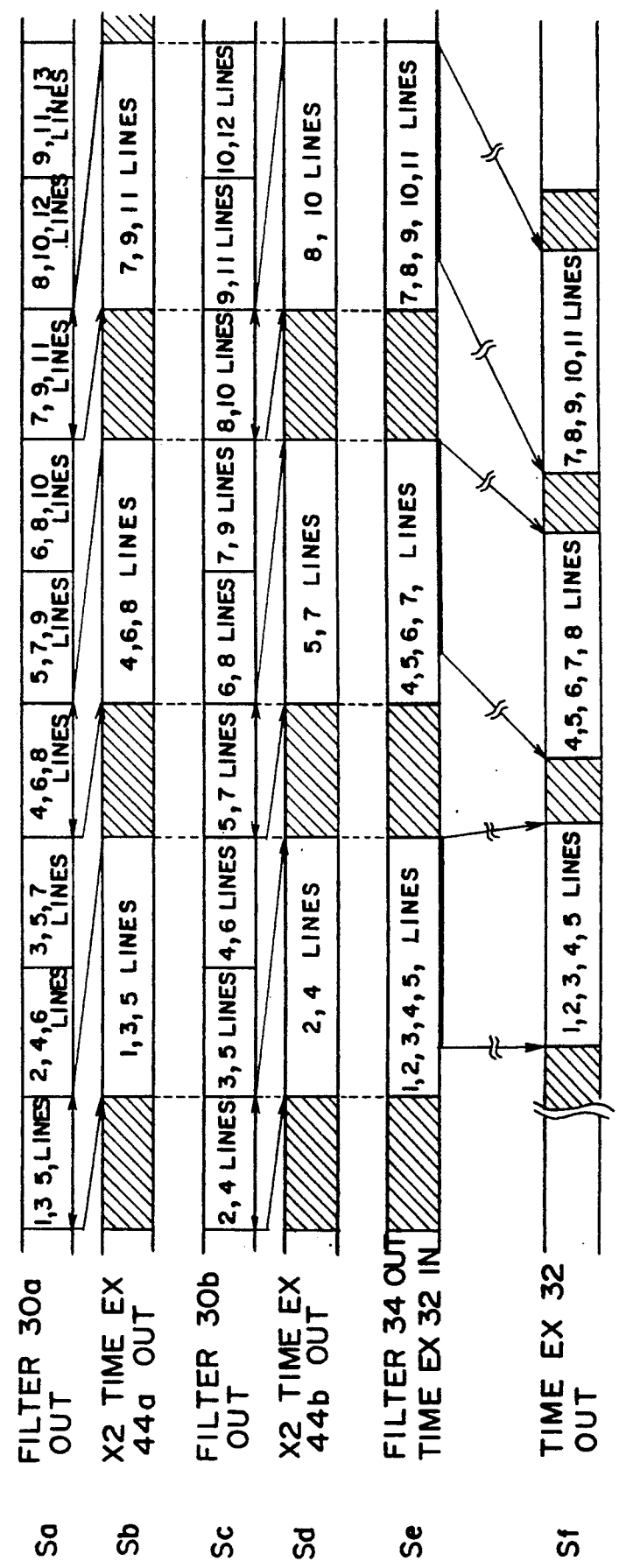
FIG. 7 is a diagrammatic view of signals processed in the circuit of FIG. 6.

As shown in FIG. 7, particularly signals Sa and Sb, the time base 2-times expansion circuit 44a, writes one of three filtered MUSE signals at a 16.2-MHz rate, and reads at an 8.1-MHz rate. The time base 2-times expansion circuit 44b operates in the same way, and outputs as shown by signal Sd. The signal is then processed by the vertical filter circuit 34 to produce the 16.2-MHz rate signal, as shown by signal Se. In this way, because the time base 2-times expansion circuits 44a, 44b write in one line of the MUSE signal and read out in a two line period of the MUSE signal, a storage capacity equivalent to one MUSE signal is sufficient, and the memory can therefore be integrated in the IC chip. Furthermore, the write/read time does not overlap, and processing time may be slow.

As shown in FIG. 7, signals Se and Sf, only the Y signal component of the 2-times expanded MUSE signal (heavy line area in signal Se) is written to the time base conversion circuit 32, and read as shown in signal Sf.

Figure 15:
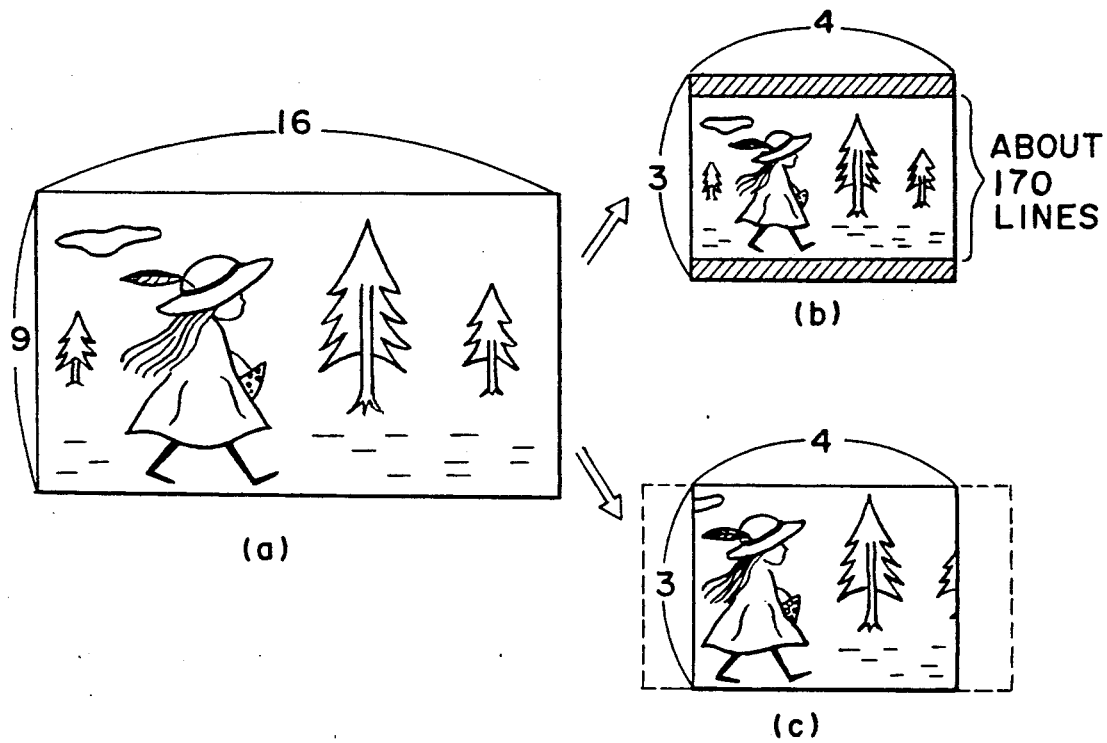
Figure 16:
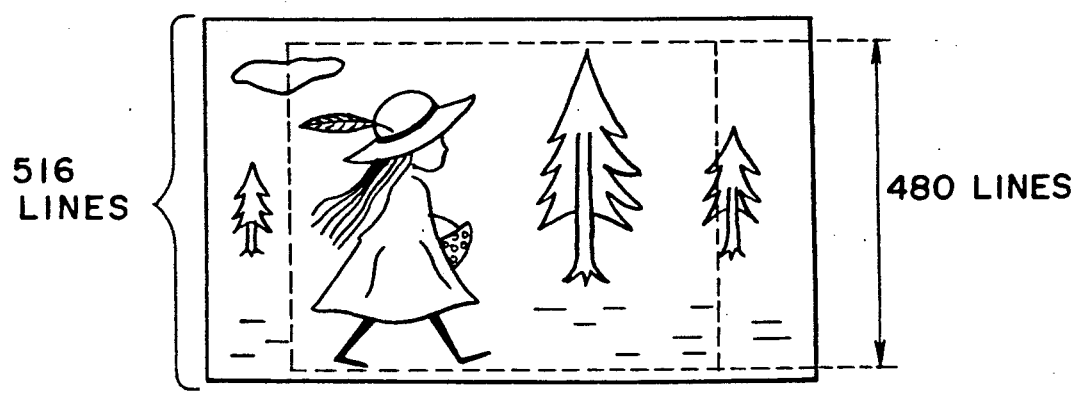

It is to be noted that reference number 46 in FIG. 6 is a post-processing circuit, and is, for example, a circuit to colorize the top and bottom bands (see FIG. 15b in a wide mode converted image, or to insert a character signal.

Thus, because there are two inputs/outputs to the external time base conversion circuit 32, the number of pins can be reduced.

Figure 8:
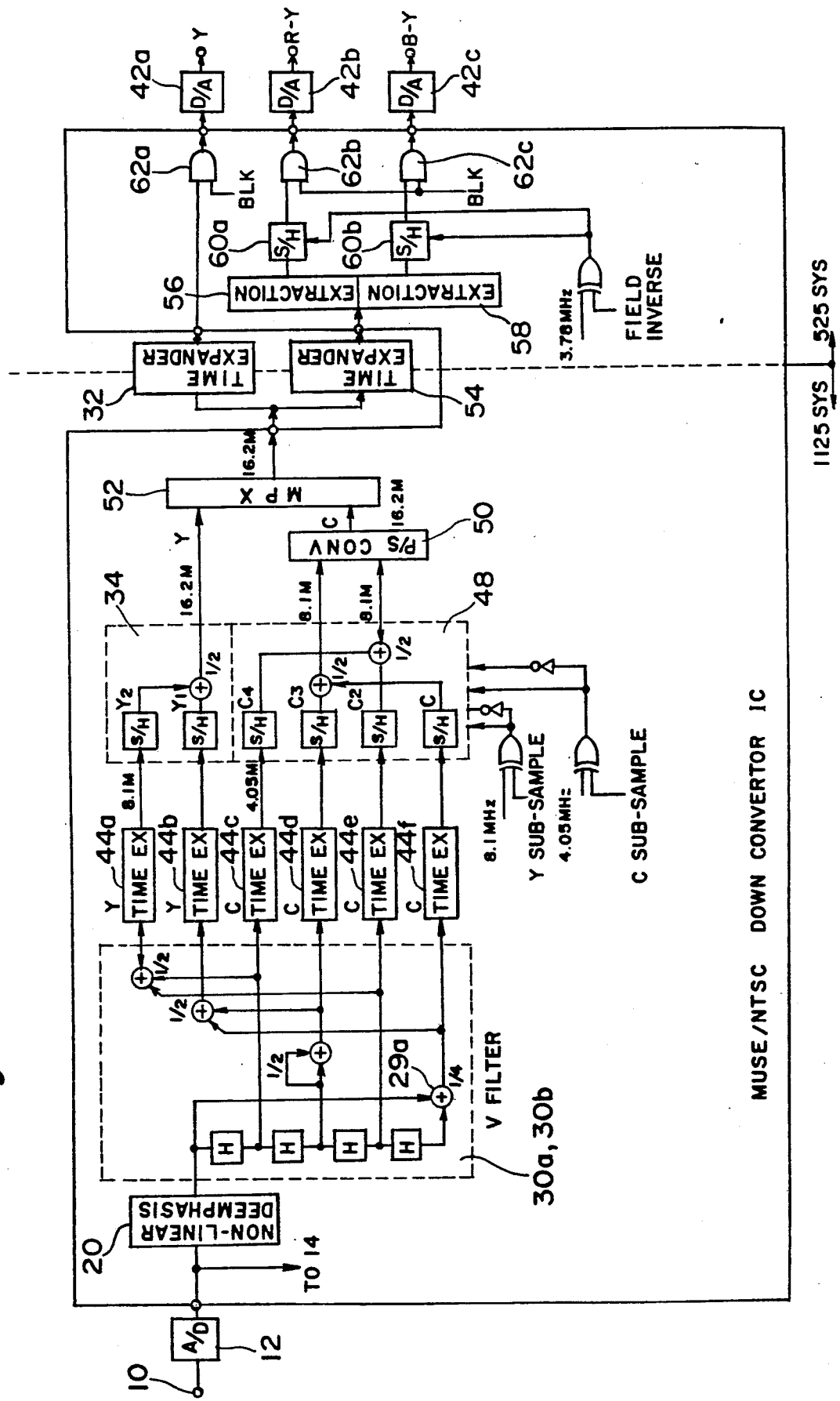
FIG. 8 is a circuit diagram of a third embodiment of the present invention.

Referring to FIG. 8, a third embodiment of the present invention is shown, which is further provided with a color difference signal processor.

Figure 9:
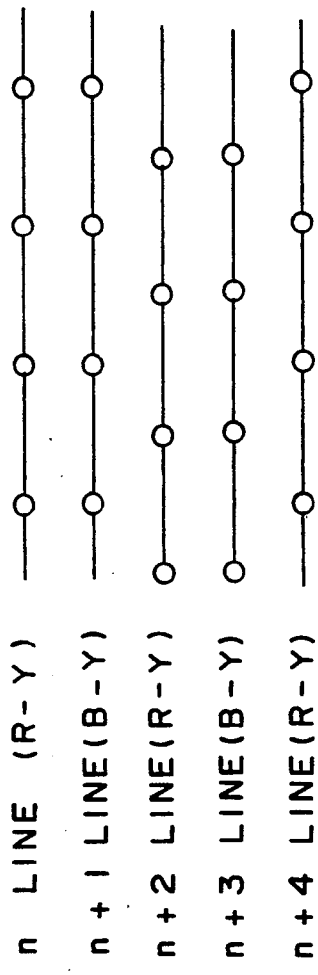

It is to be noted that, as shown in FIG. 9, the sub-sample phase of the color difference signal is a line sequence and is offset two lines. Thus, only the signal separated four lines can be simply added. For example, signal (R-Y) with the same phase will be repeated every three other lines. Thus, there is only one vertical filter circuit, comprising adder 29a, before expansion for color. It is to be noted that in FIG. 8, the ½ multiplier and ¼ multiplier are omitted, but merely figures ½ and ¼ representing the multiplying coefficients are shown.

In FIG. 8, each of 44c-44f represent a time base 4-times expansion circuit which writes the color signal component (leading horizontal component) of the MUSE signal at the rate one per three lines at a 16.2-

MHz rate, and expands and reads the signal four times at 4.05 MHz (see FIG. 11 signals Wa–Wh).

Reference number 48 is a color signal vertical filter circuit. The signals produced from circuit 48 are shown in FIG. 11, signals Wi.

Figure 10:
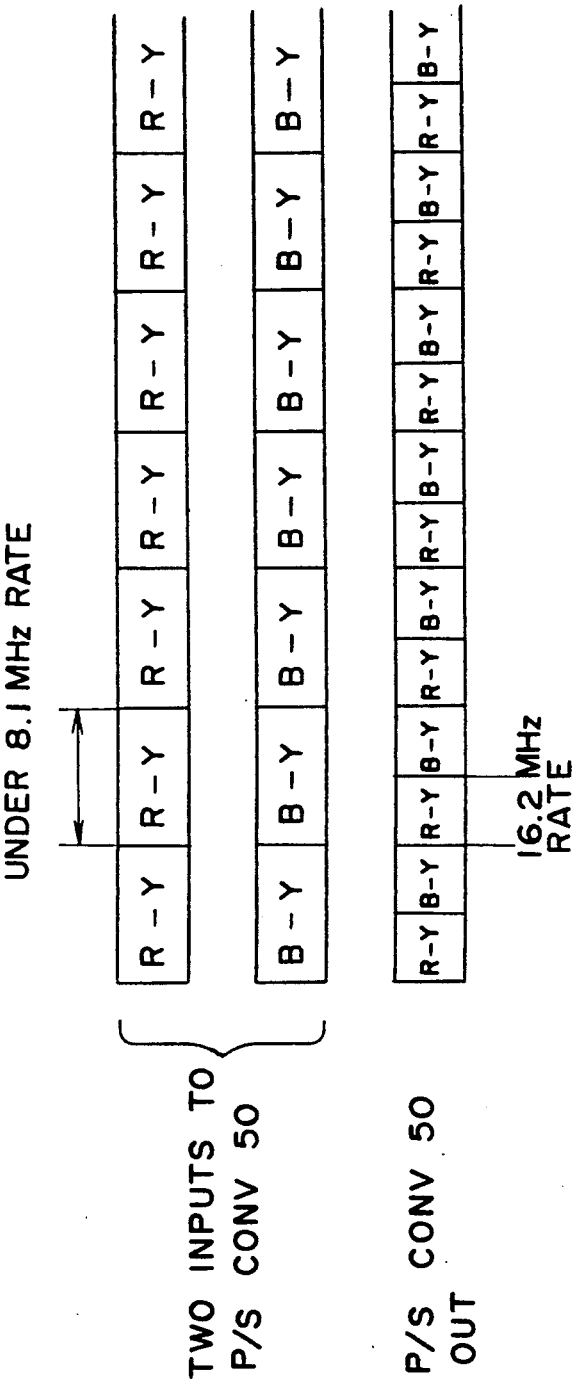
Figure 12:
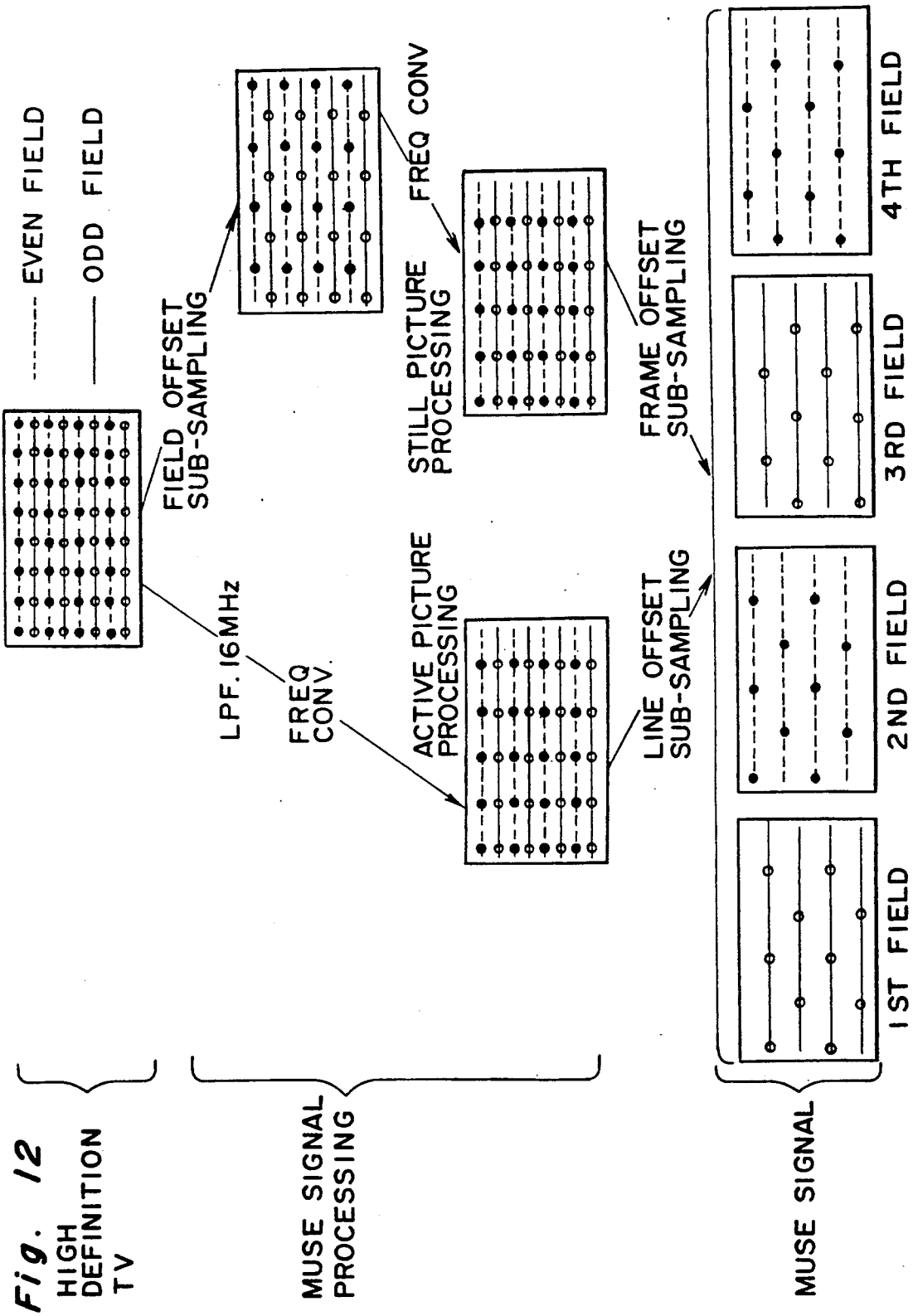
FIGS. 12 and 13 are diagrammatic views describing the MUSE signal.
Figure 13:
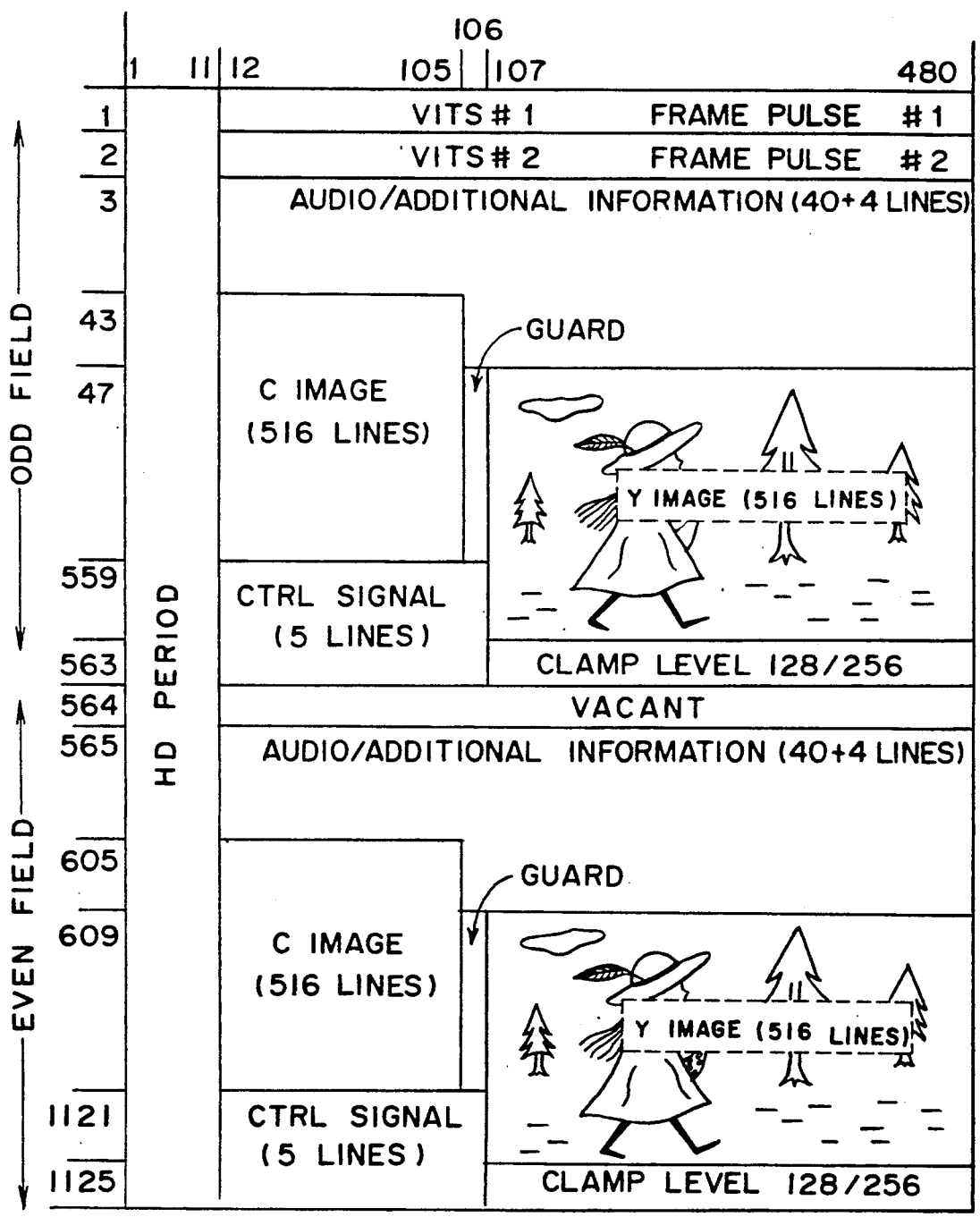
Figures 14A, 14B:
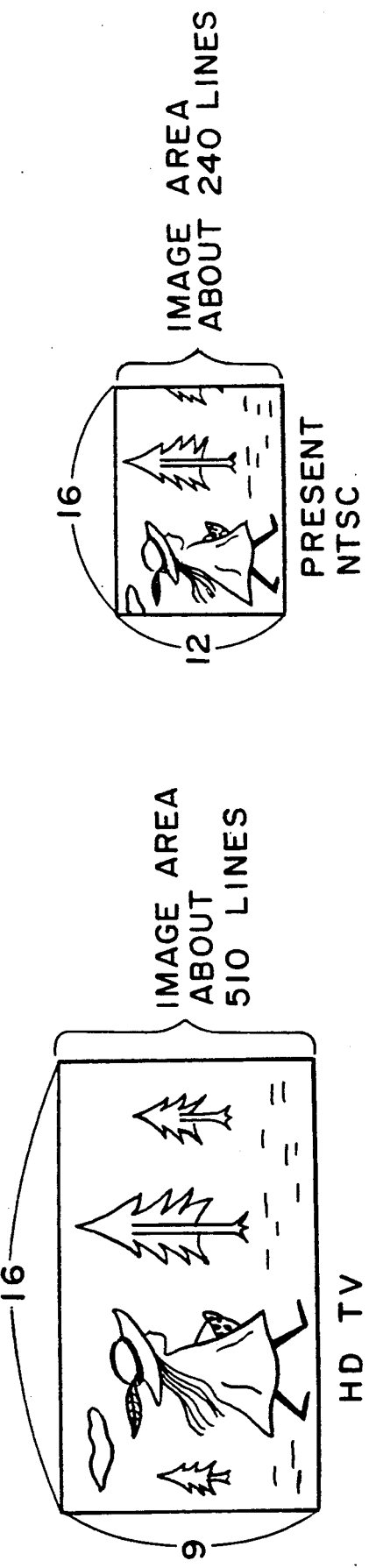
FIGS. 14, 15, and 16 are diagrammatic views describing the operation of a MUSE/NTSC signal down-convertor.

Reference number 50 is a parallel/serial conversion circuit which alternately outputs two color signals (FIG. 10, signals in first two rows) at a 16.2-MHz rate and inserts two color signals. Reference number 52 is a time base multiplex circuit which changes switch states and outputs a color signal and video signal as shown in FIG. 11, signal Wk.

Reference number 54 is a color signal time base conversion circuit. Reference number 56 is a R-Y signal extraction circuit which extracts only the R-Y signal component in the output of the time base conversion circuit 54, and 58 is a B-Y signal extraction circuit which extracts the B-Y signal component only. Reference numbers 60a, 60b are sample hold circuits. Reference numbers 62a, 62b, 62c are AND circuits for blank generation. Reference numbers 42b, 42c are D/A convertors.

In the third embodiment, the top and bottom regions are made normally black in the wide mode by AND circuits 62a–62c, but these regions may be colorized as described above, or a character signal may be inserted instead.

According to the third embodiment, the memory used for the time expander has a size enough to store fifty lines of MUSE signal, but can be made further larger, such as to store one frame of picture so as to provide a still picture image by terminating the subsequent supply of the image signal.

As described above according to the present invention, vertical filter processing of a sub-sample video signal in a MUSE signal, etc., can be accomplished without using a high clock frequency.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A convertor for converting a sub-sample television signal, which is obtained from a high density television signal by way of offset sub-sampling the horizontal scan lines of the high density television signal and time compressing the transmission band, to a standard television signal comprising:

first and second vertical filter means for filtering a plurality of lines which are adjacent to each other and have the same sub-sampling phase from said sub-sample television signal;

first and second time base expanders means for selecting predetermined lines from the lines filtered by said first and second vertical filter means and for expanding on time base said selected predetermined lines;

a third vertical filter means for processing the signal from said first and second time base expander means according to the sub-sampling phase.

2. A MUSE signal/standard television signal convertor for converting a MUSE signal to a standard television signal, comprising:

first and second vertical filter means for filtering odd lines and even lines in the MUSE signal;

first and second time base expanders means for selecting predetermined lines from the lines filtered by said first and second vertical filter means and for expanding on time base said selected predetermined lines; and a third vertical filter means for processing the signal from said first and second time base expander means according to the sub-sampling phase.

* * * * *